Aug. 27, 1963 — D. S. STRADER — 3,101,651
RECIPROCATING HYDRAULIC MOTOR
Filed Sept. 15, 1961
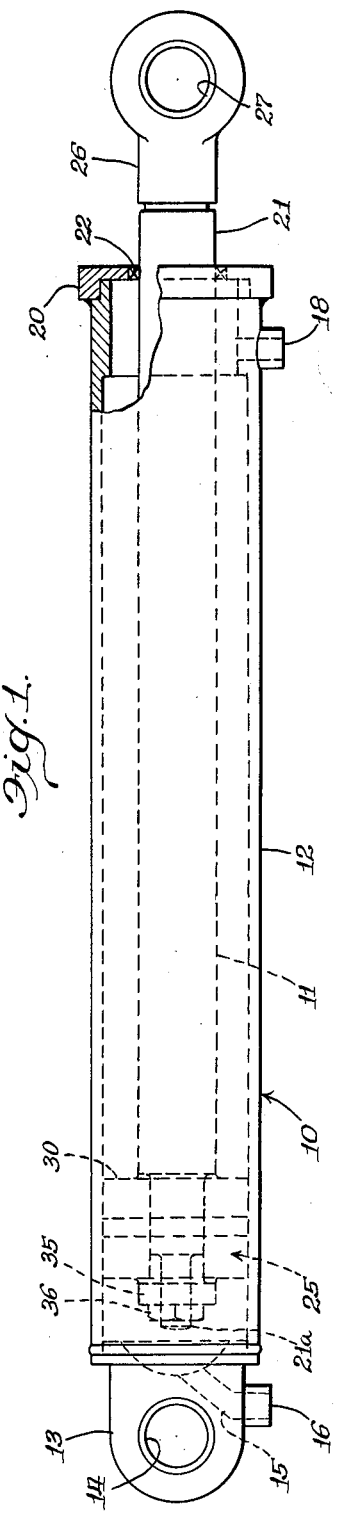
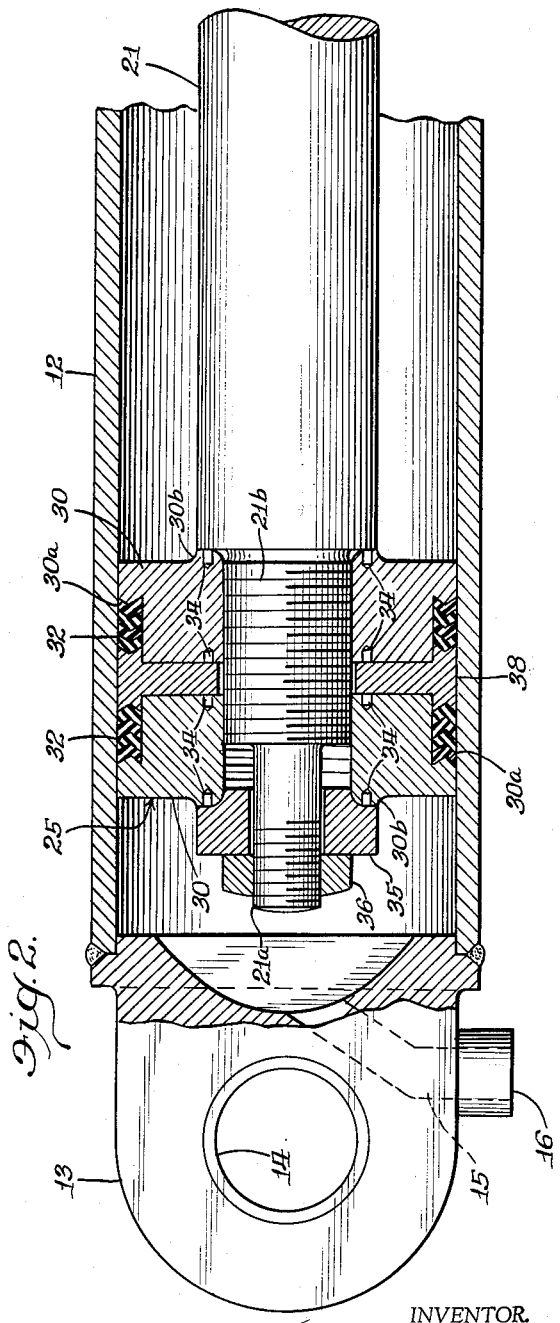
INVENTOR.
Don S. Strader
BY Paul O. Pippel
Atty.

United States Patent Office 3,101,651
Patented Aug. 27, 1963

3,101,651
RECIPROCATING HYDRAULIC MOTOR
Don S. Strader, Mount Prospect, Ill., assignor to The Frank G. Hough Co., a corporation of Illinois
Filed Sept. 15, 1961, Ser. No. 138,463
13 Claims. (Cl. 92—252)

This invention relates generally to reciprocating hydraulic motor constructions, and more particularly to piston constructions for a reciprocating hydraulic motor.

The primary object of the invention is to provide a novel piston construction for a reciprocating hydraulic motor which is relatively simple to construct and assemble using continuous ring sealing members.

A further object of the invention is to provide a novel piston construction for an hydraulic reciprocating motor of a relatively large size such as used in large earth moving machines which will efficiently operate under the application of relatively high loading forces.

Still another object of the invention is to provide a novel piston construction for an hydraulic reciprocating motor wherein the piston head is formed of a material which permits the piston head itself to be used as a bearing in the reriprocating of the piston head in the cylinder of the motor.

Still another object is to provide a two piece piston head of a die cast construction for an hydraulic reciprocating motor.

Other objects and features of the present invention will be apparent upon a perusal of the following specification and drawing in which:

FIGURE 1 is a side elevational view of a reciprocating hydraulic motor embodying the present invention; and FIGURE 2 is an enlarged view of a portion of the device shown in FIGURE 1 and taken partially in cross section.

The present embodiment is the preferred embodiment, but it is to be understood that changes can be made in the present embodiment by one skilled in the art without departing from the spirit and scope of the present invention.

Generally, the present invention comprises an hydraulic reciprocating motor having a cylinder assembly with a piston assembly slidably carried therein for reciprocating movement relative to the cylinder. Hydraulic fluid ports are provided at each end of the cylinder for the connection of hydraulic fluid conduits thereto for operation of the motor.

The novel piston construction comprises the forming of the piston rod at one end thereof with two reduced portions with the end portion being smaller in diameter than the intermediate portion. Each of the reduced portions are threaded. Two annular piston head sections are provided. The piston head sections are identical in shape and are formed of a die cast material such as a relatively soft metal. The inner diameter of each of the piston head sections is substantially that of the intermediate reduced portion of the piston rod and is formed with cooperating threads so that the piston head sections may be threaded onto the intermediate reduced portion of the piston rod. The outer periphery of each piston head section at one end thereof is formed to have a shoulder of a diameter substantially equal to the inner diameter of the cylinder of the motor so that an integral bearing ring is formed on each piston head section for engagement with the inner walls of the cylinder in a sliding relationship therewith. Each of the piston head sections is further provided with a plurality of holes capable of receiving the end of a wrench, such as a spanner wrench, for threading of the piston head sections onto the intermediate reduced portion of the piston rod.

The piston assembly further comprises a bearing ring, a plurality of sealing rings, a load ring and a relatively large nut. The bearing ring is positioned between the two piston head sections, and the sealing rings are carried on the outer periphery of each piston head section between the integrally formed bearing rings and the outer edge portions of the bearing ring. The load ring is positioned about the end reduced portion of the piston rod and the nut is threaded onto that end portion to retain the piston head assembly together as a unit.

In detail, the hydraulic reciprocating motor comprises a cylinder assembly 10 and a piston assembly 11 slidably carried therein for relative reciprocating movement therebetween.

The cylinder assembly 10 comprises a cylindrical tube 12 with an internal surface which is relatively smooth. The head end of the cylinder 12 is provided with an end member 13 which is secured over the end of the cylinder 12 by any suitable means such as welding. The end member 13 is provided with a hole therethrough and with a bushing 14 carried in that hole for connection of the head end of the motor in some tool arrangement. The end member 13 is further provided with a passageway 15 extending from a port on the outer surface thereof into a recess which opens into the cylinder 12.

The rod end of the cylinder 12 is provided with a port 18 therethrough for the connection of a hydraulic fluid conduit thereto to deliver hydraulic fluid to the rod end of the cylinder 12. The rod end of the cylinder 12 is also provided with an end member 20 which may be secured thereto by any suitable means. The end member 20 is provided with a hole axially therethrough for the piston rod 21 of the piston assembly 11. Any suitable sealing means, as at 22, is provided between the rod end of the cylinder 12 and the piston rod 21 to permit reciprocation of the piston assembly 11 relative to the cylinder assembly 10 without the leakage of any appreciable amount of hydraulic fluid from between the end member 20 and the piston rod 21.

The piston assembly 11 comprises, in addition to the piston rod 21, a piston head assembly 25 carried on the inner end of the piston rod 21. The outer end of the piston rod 21 is provided with a member 26 having a hole therethrough which carries a bushing 27 for pivotally connecting the motor in a tool arrangement.

The inner end of the piston rod 21 is formed with two contiguous reduced portions, 21a at the end and 21b spaced from the end thereof. Both portions 21a and 21b are threaded and portion 21a is substantially smaller in diameter than portion 21b.

The piston head assembly 25 further comprises two identical annular piston head sections 30 which are die cast of a relatively soft metal. The axial hole through each piston head section 30 is threaded for cooperation with the threads on the reduced portion 21b of the piston rod 21. Each piston head section 30 at one end thereof is formed to have a shoulder 30a of a diameter substantially equal to the inner diameter of the cylinder 12 thereby forming an integral bearing ring. The sealing rings 32 are carried on the remaining portion of the outer periphery of each piston head section 30 and are retained on one side by the integral bearing rings 30a.

Each piston head section 30 is further provided with an integrally formed boss 30b concentrically positioned about the threaded hole therethrough. The bosses 30b provide for relief of stresses set up in the piston head sections 30 by loads upon the piston head assembly 25. Each piston head section 30 is further provided on each side thereof with a plurality of spaced holes 34 for receiving the end of a wrench such as a spanner wrench.

The piston head assembly 25 further comprises a relatively large load ring 35 having an inner diameter slightly larger than the reduced portion 21a of the piston rod 21.

The outer diameter of the ring 35 is substantially equal to the outer diameter of the bosses 30b of the piston head sections 30. The bosses 30b have an outer diameter which is substantially equal to the diameter of the major portion of the piston rod 21. A relatively large nut 36 is also provided for cooperation with the load ring 35.

The piston head assembly 25 further comprises a bearing ring 38 formed of a relatively soft metal such as bronze. The bearing ring 38 has an inner diameter slightly larger than the diameter of the intermediate portion 21b of the piston rod 21. The outer diameter of the bearing ring 38 is substantially equal to the inner diameter of the cylinder 12. Each side of the outer periphery of the bearing ring 38 is provided with an axially extending annular ring having a V-shaped recess therein for cooperation with the projecting side of the sealing rings 32. The sealing rings 32 are somewhat V-shaped in cross section and are formed of a fabric impregnated with a resilient material such as rubber or neoprene. The inner side of each integral bearing ring 30a of the piston head sections 30 is formed with a projection conforming to the V-shaped depression on one side of the sealing rings 32.

The piston head assembly 25 is initially assembled on the piston rod 21 before the piston rod 21 is inserted in the cylinder 12. One piston head section 30 is threaded onto the intermediate portion 21b of the piston rod 21 by a spanner wrench inserted in the holes 34 thereof. The piston head section 30 is threaded onto the portion 21b of the piston rod 21 until the boss 30b firmly engages the radially extending side wall of the major portion of the piston rod 21. The sealing rings 32 for that piston head section 30 are disposed about the periphery of the piston head section 30 and against the integral bearing ring 30a. The bearing ring 38 may then be slipped over the intermediate portion 21b and against the mounted piston head section 30. The other piston head section 30 and the sealing rings 32 thereof may then be threaded onto the intermediate portion 21b until the second piston head section firmly engages the bearing ring 38. A spanner wrench may again be used to secure the second piston head section 30 in position. The load ring 35 is then inserted onto the end portion 21a of the piston rod 21 in engagement with the boss 30b of the second piston head section. The nut 36 is then threaded onto the end portion 21a of the piston rod 21 until the nut 36 firmly engages the load ring 35 to maintain the entire piston head assembly 25 together as a unit. The piston assembly 11 may then be positioned in the cylinder assembly 10 and the portions 30a of the piston head sections 30 will cooperate with the inner wall of the cylinder 12 as bearings to permit the piston assembly 11 to be reciprocated in the cylinder 12 by the application of hydraulic fluid under pressure to either one of the ports 16 or 18. The bearing ring 38 will also function as a bearing in cooperation with the inner wall of the cylinder 12, and the sealing rings 32 will engage the inner wall of the cylinder 12 in a sealing relationship therewith to prevent any leakage of hydraulic fluid from one side of the piston head assembly 25 to the other side thereof. The load ring 35 and the piston rod 21 in engagement with the bosses 30b of the piston head sections 30 will absorb the loading forces applied to the piston head sections 30.

Having described the invention, what is considered new and desired to be protected by Letters Patent is:

1. A piston assembly for a hydraulic reciprocating motor comprising, a piston rod having a certain diameter, one end portion of said piston rod being formed of a reduced diameter, a piston head formed of a relatively soft bearing metal, said piston head having a hole axially therethrough of a diameter substantially equal to said reduced diameter, a boss formed on each side of said piston head about said hole, each of said bosses having an outer diameter substantially equal to said certain diameter, said piston head carried on said reduced end portion with the boss on one side thereof abutting the side wall of said piston rod which extends radially from reduced end portion to said certain diameter, a load ring having an outer diameter substantially equal to said certain diameter, said load ring carried on said reduced end portion and abutting the boss on the other side of said piston head, and means for maintaining said load ring in tight engagement with said piston head.

2. A piston assembly for a hydraulic reciprocating motor comprising, a piston rod having a certain diameter, one end portion of said piston rod being formed of a reduced diameter and being threaded, a piston head formed of a relatively soft bearing metal and having a threaded hole therethrough of a diameter substantially equal to said reduced diameter of said end portion, a boss formed on each side of said piston head about said threaded hole, each of said bosses having an outer diameter substantially equal to said certain diameter, said piston head threaded onto said reduced end portion with the boss on one side thereof abutting the side wall of said piston rod which extends radially from said reduced end portion to said certain diameter, a load ring having an outer diameter substantially equal to said certain diameter, said load ring carried on said reduced end portion and abutting the boss on the other side of said piston head, and means for maintaining said load ring in tight engagement with said piston head.

3. A piston assembly for a hydraulic reciprocating motor comprising, a piston rod having a reduced portion at one end thereof, a pair of substantially identical formed piston head sections, said piston head sections being formed of a relatively soft bearing metal, each piston head section having a bearing ring integrally formed therewith on the outer periphery and at one side thereof, one of said piston head sections carried on said reduced portion with said one side thereof abutting the side wall of said piston rod which extends radially from said reduced portion, a bearing ring carried on said reduced portion in engagement with the other side of said one piston head section, the other of said piston head sections being carried on said reduced portion with the other side of said other piston head section engaging said bearing ring, a load ring carried on said reduced portion and abutting said one side of said other piston head section, and means for maintaining said load ring in tight engagement with said other piston head section.

4. A piston assembly as defined in claim 3, wherein said load ring has an outer diameter substantially equal to the diameter of said piston rod.

5. A piston assembly for a hydraulic reciprocating motor comprising, a piston rod having a certain diameter, one end portion of said piston rod being formed of a reduced diameter, a pair of substantially identically formed piston head sections, said piston head sections being formed of a relatively soft bearing metal, each piston head section having a bearing ring integrally formed therewith on the outer periphery and at one side thereof, each of said piston head sections having a hole axially therethrough of a diameter substantially equal to said reduced diameter, a boss formed on said one side of each of said piston head sections about said hole, each of said bosses having an outer diameter substantially equal to said certain diameter, one of said piston head sections carried on said reduced portion with said one side thereof abutting the side wall of said piston rod which extends radially from said reduced portion, a bearing ring carried on said reduced portion in engagement with the other side of said one piston head section, the other of said piston head sections being carried on said reduced portion with the other side of said other piston head section engaging said bearing ring, a load ring carried on said reduced portion and abutting the boss on said one side of said other piston head section, and means for maintaining said load ring in tight engagement with said other piston head section.

6. A piston assembly for a hydraulic reciprocating motor comprising, a piston rod having a certain diameter, one end portion of said piston rod being formed of a reduced diameter and being threaded, a pair of substantially identically formed piston head sections, said piston head sections being formed of a relatively soft bearing metal, each piston head section having a bearing ring integrally formed therewith on the outer periphery and at one side thereof, each of said piston head sections having a threaded hole therethrough of a diameter substantially equal to said reduced diameter of said end portion, a boss formed on said one side of each of said piston head sections about said threaded hole, each of said bosses having an outer diameter substantially equal to said certain diameter, one of said piston head sections threaded onto said reduced end portion with the boss on said one side thereof abutting the side wall of said piston rod which extends radially from said reduced end portion to said certain diameter, a bearing ring carried on said reduced portion in engagement with the other side of said one piston head section, the other of said piston head sections being threaded onto said reduced end portion with the other side of said other piston head section engaging said bearing ring, a load ring having an outer diameter substantially equal to said certain diameter, said load ring carried on said reduced end portion and abutting said boss on said one side of said other piston head section, and means for maintaining said load ring in tight engagement with said other piston head section.

7. A piston assembly for a hydraulic reciprocating motor comprising, a piston rod having two contiguous reduced portions at one end thereof with the endmost reduced portion being of a diameter substantially less than the diameter of the intermediate reduced portion, a piston head formed of a relatively soft bearing metal, said piston head carried on said intermediate reduced portion with one side thereof abutting the side wall of said piston rod which extends radially from said reduced portion, a load ring carried on said endmost reduced portion and abutting the other side of said piston head, and means for maintaining said load ring in tight engagement with said piston head.

8. A piston assembly for a hydraulic reciprocating motor comprising, a piston rod having a certain diameter, one end portion of said piston rod being formed of two contiguous portions of reduced diameters with the endmost portion being of a diameter substantially less than the diameter of the intermediate portion, a piston head formed of a relatively soft bearing metal, said piston head carried on the intermediate reduced portion with one side thereof abutting the side wall of said piston rod which extends radially from said intermediate reduced portion to said certain diameter, a load ring having an outer diameter substantially equal to said certain diameter and an inner diameter substantially equal to the diameter of said endmost reduced portion, said load ring carried on said endmost reduced portion and abutting the other side of said piston head, and means for maintaining said load ring in tight engagement with said piston head.

9. A piston assembly for a hydraulic reciprocating motor comprising, a piston rod having a certain diameter, one end portion of said piston rod being formed of two contiguous reduced portions with the endmost portion being of a diameter substantially less than the diameter of the intermediate portion, a piston head formed of a relatively soft bearing metal, said piston head having a hole axially therethrough of a diameter substantially equal to the diameter of said intermediate reduced portion, a boss formed on each side of said piston head about said hole, each of said bosses having an outer diameter substantially equal to said certain diameter, said piston head carried on said intermediate reduced portion with the boss on one side thereof abutting the side wall of said rod which extends radially from said intermediate reduced portion to said certain diameter, a load ring having an inner diameter substantially equal to the diameter of said endmost portion and an outer diameter substantially equal to said certain diameter, said load ring carried on said endmost reduced portion and abutting the boss on the other side of said piston head, and means for maintaining said load ring in tight engagement with said piston head.

10. A piston assembly for a hydraulic reciprocating motor comprising, a piston rod having a certain diameter, one end portion of said rod being formed of two contiguous portions of reduced diameters with the endmost portion being of a diameter substantially less than the intermediate portion, each of said two portions being threaded, a piston head formed of a relatively soft bearing metal and having a threaded hole therethrough of a diameter substantially equal to the diameter of said intermediate reduced portion, a boss formed on each side of said piston head about said threaded hole, each of said bosses having an outer diameter substantially equal to said certain diameter, said piston head threaded onto said intermediate reduced portion with the boss on one side thereof abutting the side wall of said piston rod which extends radially from said intermediate reduced portion to said certain diameter, a load ring having an inner diameter substantially equal to the diameter of said endmost reduced portion and an outer diameter substantially equal to said certain diameter, said load ring carried on said endmost reduced portion and abutting the boss on the other side of said piston head, and a nut threaded onto said endmost reduced portion and engaging said load ring to maintain said load ring in tight engagement with said piston head.

11. A piston assembly for a hydraulic reciprocating motor comprising, a piston rod having two contiguous portions at one end thereof of reduced diameters with the endmost portion being of a diameter substantially less than the intermediate portion, a pair of substantially identically formed piston head sections, said piston head sections being formed of a relatively soft bearing metal, each piston head section having a bearing ring integrally formed therewith on the outer periphery and at one side thereof, one of said piston head sections carried on said intermediate reduced portion with said one side thereof abutting the side wall of said piston rod which extends radially from said intermediate reduced portion, a bearing ring carried on said intermedate reduced portion in engagement with the other side of said one piston head section, the other of said piston head sections being carried on said reduced portion with the other side of said other piston head section engaging said bearing ring, a load ring carried on said endmost reduced portion and abutting said one side of said other piston head section, means for maintaining said load ring in tight engagement with said other piston head section, and two groups of sealing rings, each group of sealing rings being carried on one of said piston head sections between said bearing ring and said integrally formed bearing ring.

12. A piston assembly as defined in claim 11, wherein said load ring has an outer diameter substantially equal to the diameter of said piston rod.

13. A piston assembly for a hydraulic reciprocating motor comprising, a piston rod having a certain diameter, one end portion of said piston rod being formed of two contiguous portions of reduced diameters with the endmost portion having a diameter substantially less than the diameter of the intermediate portion, each of said reduced portions being threaded, a pair of substantially identically formed piston head sections, said piston head sections being formed of a relatively soft bearing metal, each piston head section having a bearing ring integrally formed therewith on the outer periphery and at one side thereof, each of said piston head sections having a threaded hole therethrough of a diameter substantially equal to the diameter of said intermediate portion, a boss integrally formed on said one side of each of said piston head sections about said threaded hole, each of said bosses having an outer diameter substantially equal to said certain diameter, one of said piston head sections threaded on said intermediate reduced portion with the boss on said one side thereof abutting the side wall of said piston rod which extends radially from said intermediate reduced portion to said certain diameter, a bearing ring carried on said intermediate reduced portion in engagement with the other side of said one piston head section, the other of said piston head sections being threaded on said intermediate reduced portion with the other side of said other piston head section engaging said bearing ring, a load ring having an inner diameter substantially equal to the diameter of said endmost reduced portion and an outer diameter substantially equal to said certain diameter, said load ring carried on said endmost reduced portion and abutting the boss on said one side of said other piston head section, a nut threaded onto said endmost reduced portion in engagement with said load ring to maintain said load ring in tight engagement with said other piston head section, and two groups of sealing rings, each group of sealing rings carried on the periphery of one of said piston head sections between said bearing ring and the integrally formed bearing ring thereof.

References Cited in the file of this patent
UNITED STATES PATENTS

| | | |
|---|---|---|
| 2,267,882 | Wilson | Dec. 30, 1941 |
| 2,529,053 | Simmons | Nov. 7, 1950 |